3,614,848
FOAM STRUCTURAL ELEMENT
Robert A. Hitch, Cincinnati, Ohio, assignor to
Pullman Incorporated, Chicago, Ill.
Original application June 9, 1964, Ser. No. 373,694, now Patent No. 3,472,728, dated Oct. 14, 1969. Divided and this application May 8, 1969, Ser. No. 840,577
Int. Cl. B32b 3/12, 5/18, 27/40
U.S. Cl. 52—747
4 Claims

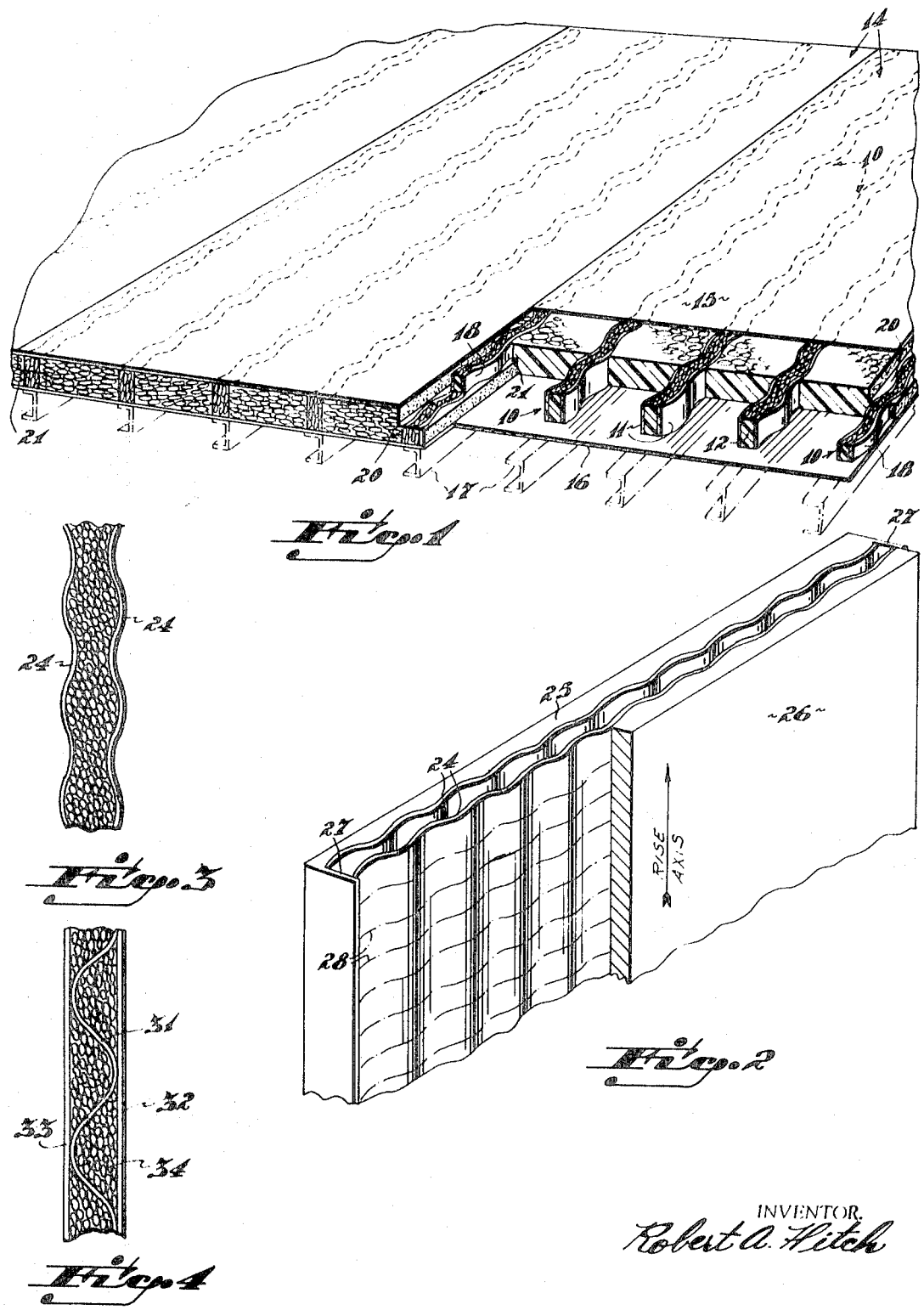

ABSTRACT OF THE DISCLOSURE

An insulated panel having a prefabricated sandwich construction which is provided with a pair of parallel sheets separated from one another by a plurality of spaced apart spacers having foamable material between the spacers and the sheets wherein each of the spacers is defined by a pair of parallel strips defining a second space filled with such foamable material having the columnar growth or rise axis of the foamable material being in a direction perpendicular to the length of the strips and parallel to the plane of said strips.

---

This is a divisional application of my co-pending application, Ser. No. 373,694, filed June 9, 1964, now U.S. Pat. No. 3,472,728 granted Oct. 14, 1969.

This invention relates to an insulated panel and more particularly the invention is directed to a pre-fabricated sandwich of a plastic foamed between a pair of spaced parallel sheets. Still more specifically, the invention is directed to an insulated panel which is used primarily in the floor of a refrigerated cargo body or other environment in which it is subjected to compressive loading.

In the past, it has been the practice to construct such panels of a pair of spaced plywood sheets having elongated two by fours spacing the sheets apart with the low thermoconductive plastic material foamed-in-place between the sheets. In the co-pending application of George R. Heffner, Ser. No. 371,426 filed June 1, 1964, now U.S. Pat. No. 3,470,058 granted Sept. 30, 1969, it has been pointed out that there are many advantages to be derived from the elimination of the wood cross bolsters and the substitution therefor of a material which is substantially entirely the foam employed to fill the major portion of the space between the two sheets. The substitution of the foam for the wood spacers results in a structure which has superior insulative qualities and which is markedly lighter in weight, thereby increasing the pay-load which can be carried by the cargo container.

The difficulty with the substitution of a plastic foam for the wood in such floor panels is that that plastic foam does not even approach the ability of wood to withstand compressive loading. In addition to its insulative qualities, the floor panel of the type to which the present invention is directed must withstand compression stress and must transmit the compression load on its upper surface to the transverse vehicle frame members which support the floor panels.

Heffner, in the co-pending application, has disclosed the combination of a tubular paper or plastic skin and foam united to form discs which exhibit a remarkable compression strength. He has also disclosed a particular method of making the compression disc-like supporting members wherein the members are adapted to receive a loading in the direction of the rise axis of the foam, the foam exhibiting a markedly greater resistance to compression strength in the direction of the rise axis as contrasted to the strength in a direction transverse to the rise axis.

The objective of the present invention has been to provide an elongated substantially foam structural element, in the nature of a two by four, which is able to withstand substantial compression loads but which is much lighter than wood and which has an insulative quality which is markedly superior to that of wood.

More specifically, it has been an objective of the invention to provide elongated bars of foamed plastic material sandwiched between cardboard strips in which the rise axis of the foam is perpendicular to the elongated strips and parallel to the plane of the strips. This feature of the invention permits the use of the sinuous spacers of the invention disclosed in the copending application of Donald M. Turnbull, Ser. No. 371,450, filed June 1, 1964 now U.S. Pat. No. 3,446,692, granted May 27, 1969, while utilizing the increased strength of material in a direction parallel to the rise axis as disclosed in the Heffner application.

It has been still another objective of the invention to provide an insulative sandwich panel employing the elongated elements of the present invention.

This and other objectives of the invention will become more readily apparent from the following detailed description in which:

FIG. 1 is a perspective view partly broken away of a panel structure employing the present invention, FIG. 2 is a perspective view illustrating the method of making the spacer elements employed in the panel of FIG. 1, and FIGS. 3 and 4 are diagrammatic views of alternative forms of the invention.

The structural elements formed in accordance with the present invention and a floor structure utilizing them is illustrated in FIG. 1. Each structural element, indicated at 10, is constituted by a pair of chipboard side walls 11 which are, in the illustrated example, approximately three-sixteenths of an inch thick and four inches high. Between the chipboard side walls 11 is low thermoconductive polyurethane foam 12 which has been foamed-in-place so that its rise axis is parallel to the side walls 11 and perpendicular to the length of the element 10.

A principal use of the structural elements as indicated above, is in the formation of a floor structure for an insulated cargo body. The formation of such a floor structure is diagrammatically illustrated in FIG. 1. A more completely detailed statement of the manner in which the floor structure is formed and related to the rest of the cargo body structure is set forth in the co-pending application of Heffner referred to above.

The elements 10 are employed as spacers in a sandwich panel 14 and are disposed in spaced parallel relation between an upper sheet 15 and a lower sheet 16. In the use of the panels as an insulated floor for a cargo body, the spacers are on twelve inch centers so that they will overlie transverse members or crossbearers 17 which form a part of the main frame of the cargo body. By disposing the spacers under the cross members, compression forces which are imparted to the spacers will be transmitted directly to the cross members.

The panels are formed by first tacking or otherwise securing the spacers to one of the sheets and securing the other sheet on top of the spacers. The partially formed panel is supported on one edge with the spacers extending vertically and foamable polyurethane is introduced into the sections formed between adjacent spacers.

In the preferred form of the invention, at one edge of the panel a half size spacer 18 is fixed to the edge of the bottom sheet 16 and at the opposite longitudinal edge of the panel a half size spacer 18 is fixed to the edge of the upper sheet 15. Prior to the introduction of the foam into the sandwich forms will be placed along the longitudinal edges of the panels to form rabbet grooves 20. Alternatively, the panels could be formed with planar longitudinal edges and the rabbet grooves sawed into the edges, if rabbet grooves are desired.

The rabbet grooves are provided so as to permit adjacent panels to be joined together in an overlapping relation providing a rabbet joint, as indicated at 21 in FIG. 1. The rabbet joint disposes two half size spacers 18 on top of each other and overlying a cross member 17 of the vehicle frame so as to provide, at the rabbet joint, a strong joint which will resist compression stress and which will preserve the desired insulative integrity of the floor structure.

The formation of the structural elements 10 is illustrated in FIG. 2. Two sinuous sheets 24 having their undulations extending in a horizontal direction are mounted in spaced apart relation between two supports 25 and 26. The support 25 is C-shaped and provides end wings 27 which confines the expanded foam at the ends of the sheets 24. The supports 25 and 26 have sinuous surfaces conforming to the configuration of the sheets 24. After the sheets are supported in spaced apart relation as illustrated in FIG. 2, liquid foamable polyurethane is introduced in sufficient qualities to expand from the bottom of the cavity in the sheets 24 to the top of the cavity. In practice, this requires a volume of liquid which is about one-thirtieth of the space to be filled by it. The polyurethane expands and forms the foam structure which has a rise axis in the direction of the arrow in FIG. 2. After the foam sets, the composite structure is sliced along the lines 28 thereby forming the structural elements 10.

The foaming in place of the polyurethane to form the spacers 10 provides a structure which has a greater resistance to compression applied in the direction of the rise axis. The strength is derived from two features. First, the foam and chipboard combine to form a composite structure having a resistance to compression far greater than the foam or chipboard taken alone would provide. Second, the expansion of the foam causes the resulting cell structure to be elongated in the direction of the rise axis and the elongated cells provide a structure which has a substantially greater resistance to the compression in the direction of elongation than in a direction transverse to the elongation. Further, when the spacers are combined in the panel structure with the polyurethane foamed-in-place about them, the chipboard is supported by foam on both sides and is able to support tremendous compression loads.

It should be understood that the specific structure of the spacers is subject to modification without departing from the scope of the invention, for example, a spacer may be formed as shown in FIG. 3 in which the side walls have been shifted 180° longitudinally with respect to each other so that the thickness of the spacers is nonuniform.

Still another embodiment is shown in FIG. 4, in which a single sinuous chipboard member 31 is used, that member being sandwiched between wall members 32 and 33. Foam is introduced and expanded in the cavities 34 formed between the central corrugated member 31 and the wall members 32 and 33. The technique of forming either of the members illustrated in FIGS. 3 and 4 would be substantially identical with that described in connection with FIG. 2.

The advantages derived from the panel formed in accordance with the present invention can be appreciated by reference to FIG. 1. Instead of two by four spacers extending longitudinally of the respective panels, the invention employs the spacers 10 which, except for the thin chipboard walls 11 are entirely polyurethane. Since the foam is considerably lighter in weight and has a greatly increased resistance to thermal conductivity as contrasted to wooden two by fours, the resultant structure is both lighter and of an improved insulative quality. Even at the rabbet joint 21, no appreciable sacrifice in the insulative quality of the floor or of the ability of the floor to withstand the compression loading has been made in view of the overlapping configuration of the joint and the reinforcement of it by the half spacers 10.

While a marked improvement has been made in the insulative and weight aspects of the floor construction, the floor structure is more than strong enough to meet the requirements of usage, particularly the compression loading occurring as a fork lift truck is driven into and out of the cargo space.

What is claimed is:

1. The method of forming a sandwich panel for receiving vertical compressive loading comprising the steps of:

supporting a pair of generally vertical sheets in spaced generally parallel relation, introducing a foamable plastic liquid into the space between said sheets, said foamable plastic liquid being of low thermoconductivity and being adapted to be foamed in place between said sheets such that the direction of columnar cellular growth of the foamable plastic is generally parallel to the sides of the sheets upward to the direction of pouring, producing elongation of the cellular network in upward parallel orientation to define the rise axis of the foamable plastic, permitting said plastic to foam in place and set, and slicing the resultant structure along a plurality of vertically spaced horizontal planes to produce a plurality of upright spacers, each spacer comprising a pair of strips sandwiching the foam plastic therebetween and having the rise axis of the foam plastic being upright whereby the plastic and strips are able to withstand vertical loads in the direction of the rise axis of the plastic and generally parallel to the depth of the strips, placing a plurality of spacers in upright spaced apart position between two horizontal parallel sheet members in sandwich fashion, and introducing foam plastic into the spaces formed between the spacers and the horizontal sheet members and allowing the foam plastic between the horizontal sheet members and spacers to solidify to form a horizontal panel.

2. The invention according to claim 1, and
said strips each being undulated generally in the plane passing through the length of each strip and generally perpendicular to the rise axis of the foam plastic.

3. The invention according to claim 1, and
placing the panel over crossbearers such that a spacer is located over a respective crossbearer lengthwise thereof to form a floor.

4. The invention according to claim 3, and
said strips each being undulated generally in the plane passing through the length of each strip and generally perpendicular to the rise axis of the foam plastic.

References Cited

UNITED STATES PATENTS

| 2,376,653 | 5/1945 | Boyer | 161—145 X |
| 2,753,642 | 7/1956 | Sullivan | 42—71 |
| 2,910,730 | 11/1959 | Risch | 264—45 |
| 3,231,439 | 1/1966 | Voelker | 156—79 |
| 3,446,692 | 5/1969 | Turnbull | 161—69 |
| 3,470,058 | 9/1969 | Heffner | 161—69 |

JOHN T. GOOLKASIAN, Primary Examiner

H. F. EPSTEIN, Assistant Examiner

U.S. Cl. X.R.

156—79; 161—69, 190; 264—45